United States Patent [19]

Channell

[11] 4,148,528

[45] Apr. 10, 1979

[54] SCISSOR FRAME FOR A TRUCK HOIST

[76] Inventor: Glenn L. Channell, 3739 County Rd. 7, Loveland, Colo. 80537

[21] Appl. No.: 869,916

[22] Filed: Jan. 16, 1978

[51] Int. Cl.² ............................................. B60P 1/20
[52] U.S. Cl. .................................. 298/22 J; 298/22 P
[58] Field of Search ................ 298/22 R, 22 D, 22 J, 298/22 P, 19 R; 214/1 A, 49, 501; 105/261 A, 271

[56] References Cited

U.S. PATENT DOCUMENTS

| | | | |
|---|---|---|---|
| 2,588,489 | 3/1952 | Day ..................................... | 298/22 J |
| 3,043,629 | 7/1962 | Schlueter et al. ................... | 298/22 J |
| 3,617,090 | 11/1971 | Huffman et al. ................. | 298/22 P X |
| 3,809,429 | 5/1974 | Channell ........................ | 298/22 J X |

FOREIGN PATENT DOCUMENTS 1493042  7/1967  France ................................. 298/22 P

*Primary Examiner*—L. J. Paperner
*Attorney, Agent, or Firm*—Frank C. Lowe

[57] ABSTRACT

A scissor frame for a truck hoist for stabilizing a dump body mounted upon a truck when it is lifted and tilted. The frame includes an upper leg and a lower leg hinged together by an offset pivot to permit the legs to fold against each other. The lower leg is connected to a saddle pivot mounted upon the truck frame. The upper leg is connected to a support pivot mounted upon the longitudinal base beams of the dump body, and when the dump body is retracted with the base beams lying upon the truck frame, the support pivot nests against the saddle pivot and the folded legs lie upon cross members of the truck frame in the space between the longitudinal base beams of the dump body.

To resist torsional and lateral strains, each leg is a torsionally-rigid, rectangular tube. The combined cross sectional height of the tubes, as when folded together, cannot exceed the distance between the truck frame cross members, whereon the lower leg will lie, and the cross sills of the dump body which are carried by the base beams.

The hoist is actuated by a pair of compound cylinders pivotally mounted on gusset plates at each side of the lower leg. Each cylinder extends to and is pivotally connected to an ear affixed to the upper leg or to the support pivot. The pivotal connections at the gusset plates and ears can be selectively located to position the cylinder for the most efficient operation.

9 Claims, 9 Drawing Figures

SCISSOR FRAME FOR A TRUCK HOIST

This invention relates to hoists to elevate tilting bodies, and more particularly to scissor frames for hoists for dump trucks and the like. As such, the invention will be hereinafter called a "scissor frame", or simply "frame" and will be described as being mounted upon a dump truck to constitute part of the hoist assembly which elevates and tips the body of the truck. Reference is made to Disclosure Document, filed May 10, 1976, No. 049135.

Reference is made to the scissor frame disclosed in my patent, U.S. Pat. No. 3,809,249, issued May 7, 1974, wherein the scissor frame was formed of tubular members, including an upper central tongue frame and a pair of spaced-apart lower side frame members. The tongue frame nests laterally between the side frame members when the hoist is retracted. The tongue frame and side frame members are hinged together at one end and their opposite ends are hinged to the dump body and to the truck frame, respectively. A multi-stage cylinder, at each side of the central tongue, between the tongue and the adjacent side frame member, extends these members to lift and tilt the dump body.

This frame, of tubular members, was found to be capable of resisting torsion better than hoists with other types of frames commonly made of channel sections. This was an important factor in better controlling the lateral tipping, rocking or side shift of a dump body as it is being elevated rearwardly for dumping. Several factors can cause this side shift. If the ground surface whereon the truck is located slopes sidewise, the resulting side shift of the dump body as it is being elevated is increased by an uneven flexure of the axle springs of the truck and a twisting flexure of the dump body. Even on level ground, an unbalanced load or a sticky load in the dump body can cause a severe side shift with the axle spring deflections and the twisting of the dump body acting in a cumulative manner.

At the time the frame disclosed in the U.S. Pat. No. 3,809,249 was developed, in 1972, the largest available trucks were the double-axle or tandem axle type with dump bodies having a maximum length of about 20 feet and a maximum permissible capacity of not more than 48,000 pounds, depending upon the state wherein they were used. That hoist frame was developed because other conventional hoist frames were deficient in rigidity as above mentioned. Subsequently, after 1974, triple axle trucks were introduced having bed lengths as long as 30 feet and with the maximum permissible capacity being increased to as much as 63,000 pounds. When a frame of the type disclosed in U.S. Pat. No. 3,809,249 was used for the larger trucks, it was satisfactory under ideal conditions such as for dumping a balanced, free-flowing load from a level road or ramp where the truck was positioned. However, it was not possible to obtain an effective design of this type of frame on a larger scale and for larger loads by a direct application of rules of similitude because, while the length and capacity of the truck and dump body were increased, other proportions had to remain unchanged to satisfy restrictions imposed for acceptable highway use and conventional truck configurations. For example, the width of the truck and the spacing between the longitudinal truck frame members does not change. The width and height of the dump body is not changed. Also, there can be no significant change in the spacing and the depth of the longitudinal base beams of the dump body, which establishes the limited space wherein the frame has to fit. It was found that a frame built according to patent, U.S. Pat. No. 3,809,249, was not adequate for the large dump trucks now in use and a frame having a greater torsional and lateral rigidity was needed.

The present invention was conceived and developed with the foregoing and other considerations in view, and one facet of the invention comprises, in essence, an improved scissor frame having the upper member and the lower member formed as flat rectangular tubes hinged together and hinged to the dump body and to the truck frame. These tubular members lie one on the other in the space between the longitudinal base beams of the dump body when the frame is retracted. Thus, the aggregate height of the tubular members is essentially the same as the height of a base beam which seems, at first glance, to be restrictive but was found to be adequate. The transverse width of each tubular member is selected to provide a desirable torsional stiffness. The width of a frame formed in this manner had to be such that a cylinder could be placed at each side of the frame to fit in the spaces between the frame and the longitudinal truck frame members. A frame so proportioned was found to have a torsional stiffness twice that of any comparable frame built according to the disclosure of U.S. Pat. No. 3,809,249.

Other facets of the invention lie in an improvement and a simplification of the hinge structures at the connections between the tubular members and between the tubular members and the dump body or truck frame. A further facet of the invention lies in the fact that the pivot points of the cylinders can be more effectively located to provide for more effective lifting action and an increased lift capacity for a given pair of cylinders.

It follows that objects of the invention are to provide a novel and improved scissor frame which: can be effectively mounted in the largest of dump trucks available; can use the cylinders in an efficient manner to lift the dump body under a full load; has enhanced torsional rigidity to minimize the side tipping of the body whenever it is being lifted; can be mounted, with the cylinders and other components extended between the frame members of the truck; and, is a simple, neat-appearing, economical, reliable and durable structure.

Another object of the invention is to provide a novel and improved scissor frame for smaller types of dump trucks than those hereinbefore alluded to which is so rigid torsionally and laterally that it can be extended and hold the alignment of the dump body with a single cylinder at one side of the frame. This offset arrangement is especially useful in trucks where apparatus which may be required by governmental agencies clutters a good portion of the space between the truck frame members where the cylinders would normally lie and thus prevent the use of a pair of cylinders in a balanced arrangement.

With the foregoing and other objects in view, all of which more fully hereinafter appear, my invention comprises certain constructions, combinations and arrangements of parts and elements as are hereinafter described, defined in the appended claims and illustrated in preferred embodiment in the accompanying five sheets of drawing in which:

Figure 1:
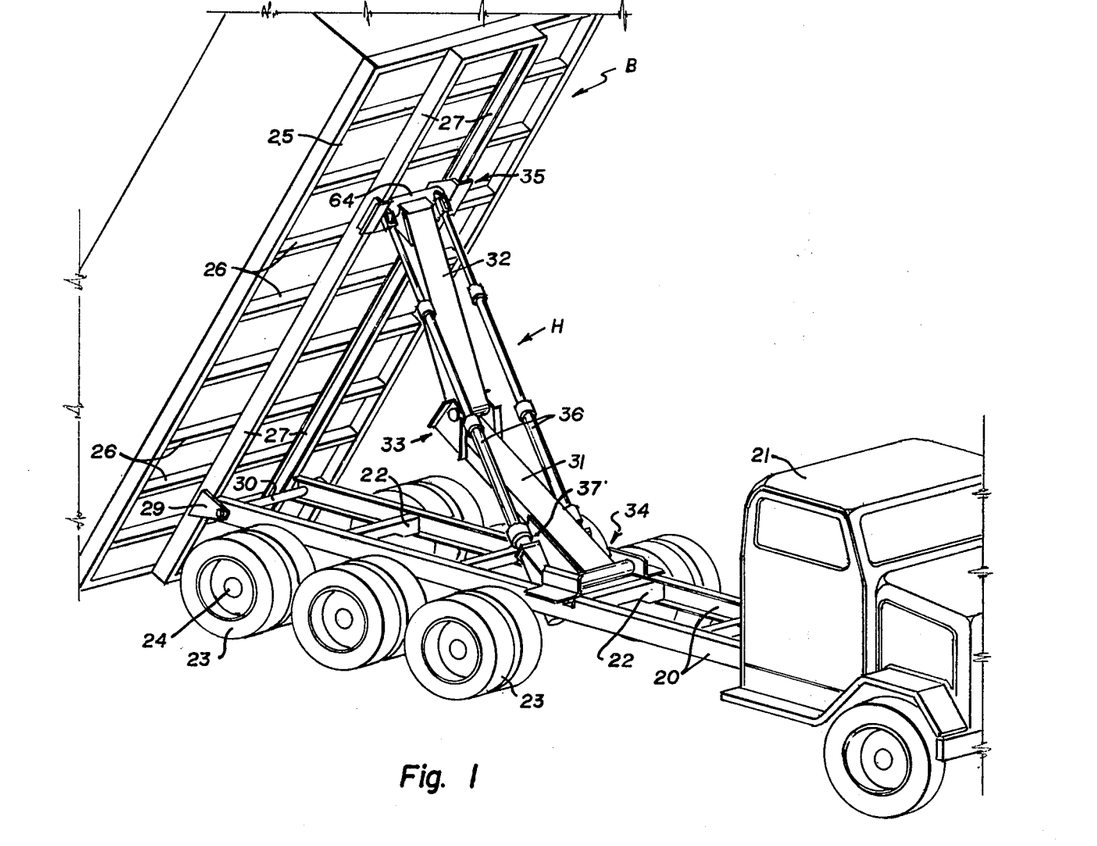
FIG. 1, at sheet 1 of the drawing, is a perspective view of the central portion of a tri-axial rear-end dump truck with the body being elevated to the dumping position by a hoist having the improved scissor frame, the view being from a location at the front and right side of the truck to illustrate the interrelation of the longitudinal frame members of the truck, the structural members at the underside of the dump body and the connection of the hoist to the truck frame and dump body beams.

Referring more particularly to the drawing, a tri-axial truck T equipped with a dump body B is also equipped with the improved hoist H. As illustrated at FIG. 1, the truck T is a conventional, tri-axial type having longitudinal main frame members 20 extending rearwardly of the cab 21 with spaced transverse cross members 22 between the frame members 20. Three sets of wheels 23, carried in tandem upon axles 24, support the rear portion of the frame members 20 in a conventional arrangement which need not be described further. Also, the conventional drive components, such as the propeller shaft and differentials are not shown nor described.

The dump body B is usually a box-type structure whose floor 25 is supported upon an array of transverse sills 26 which, in turn, are carried upon a pair of spaced longitudinal base beams 27. In certain types of truck bodies, the box may be eliminated and only a flat deck on floor 25 may be used, but the sills 26 and 27 remain the same as described. The longitudinal base beams 27 are spaced apart the same as the truck frame members 20 to lie upon spacer strips 28 affixed to the upper flanges of the frame members 20. The base beams 27 are hinged to the rear end of the frame members 20 by an ear 29 depending from each beam 27 to connect with a transverse shaft 30 at the rear of the frame members. The rear end of the dump body may cantilever beyond the rear end of the truck frame a short distance to be close to the ground whenever the body is raised and tilted to the dumping position as shown at FIG. 1. The front end of the body is immediately behind the cab 21 whenever the body B is lowered and the hoist is retracted.

The hoist H is formed by the improved scissor frame and cylinder connected thereto. The frame is mounted upon the truck frame members 20 and connect with the dump body base beams 27. When the dump body is lowered, the frame will lie, essentially, in the space between the base beams 27. As best illustrated at FIG. 1, the frame includes a lower leg 31 and an upper leg 32 which are hinged together at one end by an elbow pivot 33. This frame may be mounted upon the truck forwardly or rearwardly, that is, with the pivot 33 being forwardly of the legs or rearwardly of the legs as illustrated. The lengths of the legs are essentially the same, and while the drawing shows the upper leg as being slightly shorter than the lower leg, the upper leg could also be slightly longer than the lower leg. This will depend upon the types of trucks and dump bodies which use the frame.

Figure 2:
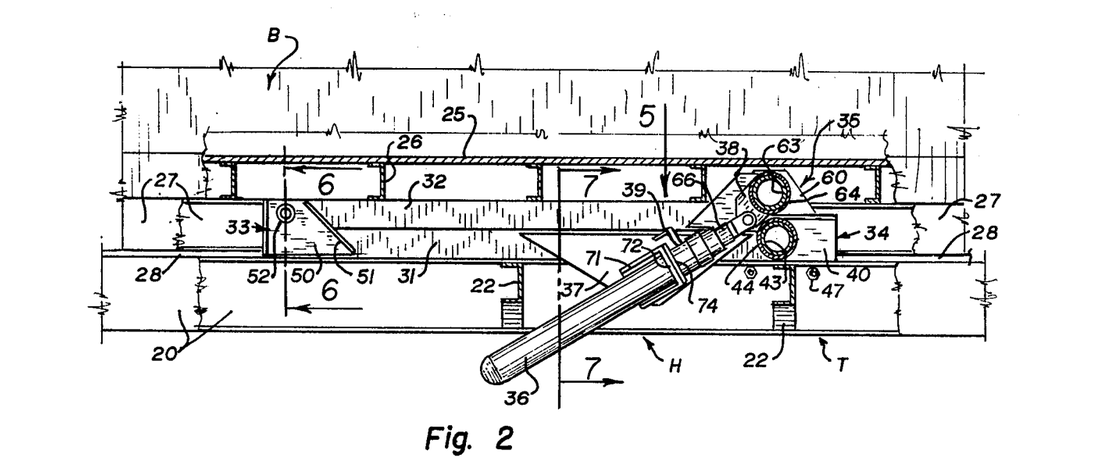
FIG. 2, at sheet 1, is a side elevational view of a portion of the truck frame, a portion of the dump body and the hoist therebetween at the retracted position, with the dump body upon the frame, the view showing the truck frame and dump body with portions broken away and in section to better depict the hoist between these members.
Figure 3:
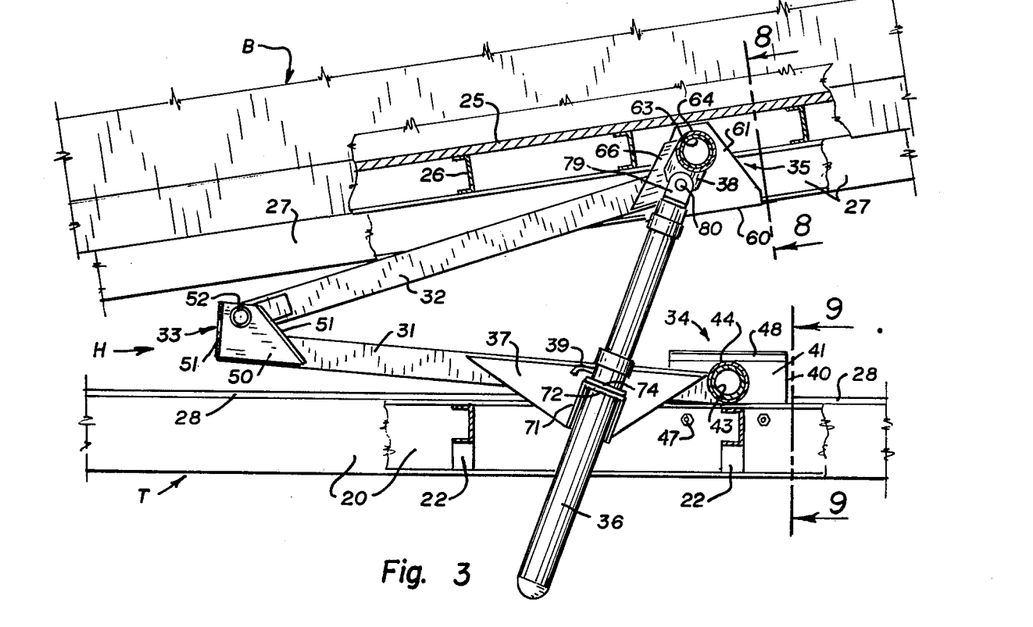
FIG. 3, at sheet 2, is a side elevational view, similar to FIG. 2 but showing the hoist partially extended with the body partially tipped, as when a dumping operation is commenced.

Each leg member is a rectangular tube whose cross sectional height is substantially less than its width. The total height of both leg members is necessarily not more than the height of the base beams 27 plus the thickness of the strip 28 and the flange thickness of the longitudinal truck frame members. This permits the leg members to fold together and lie upon the transverse cross frame members 22 when the frame is retracted, as best illustrated at FIG. 2. To provide for such a fold, the elbow pivot 33 is offset with respect to the lower leg member as hereinafter further described.

The end of the lower leg member, opposite to pivot 33, extends forwardly of the pivot and is connected to the truck frame members 20 by a transverse saddle pivot 34 a short distance behind the cab 21. The end of the upper leg member, opposite to pivot 33, also extends forwardly of the pivot and is connected to the longitudinal base beams 27 of the dump body by a transverse support pivot 35 near the front end of the dump body in correlation with the saddle pivot position to permit a proper retraction of the frame when the dump body is lowered.

Figure 4:
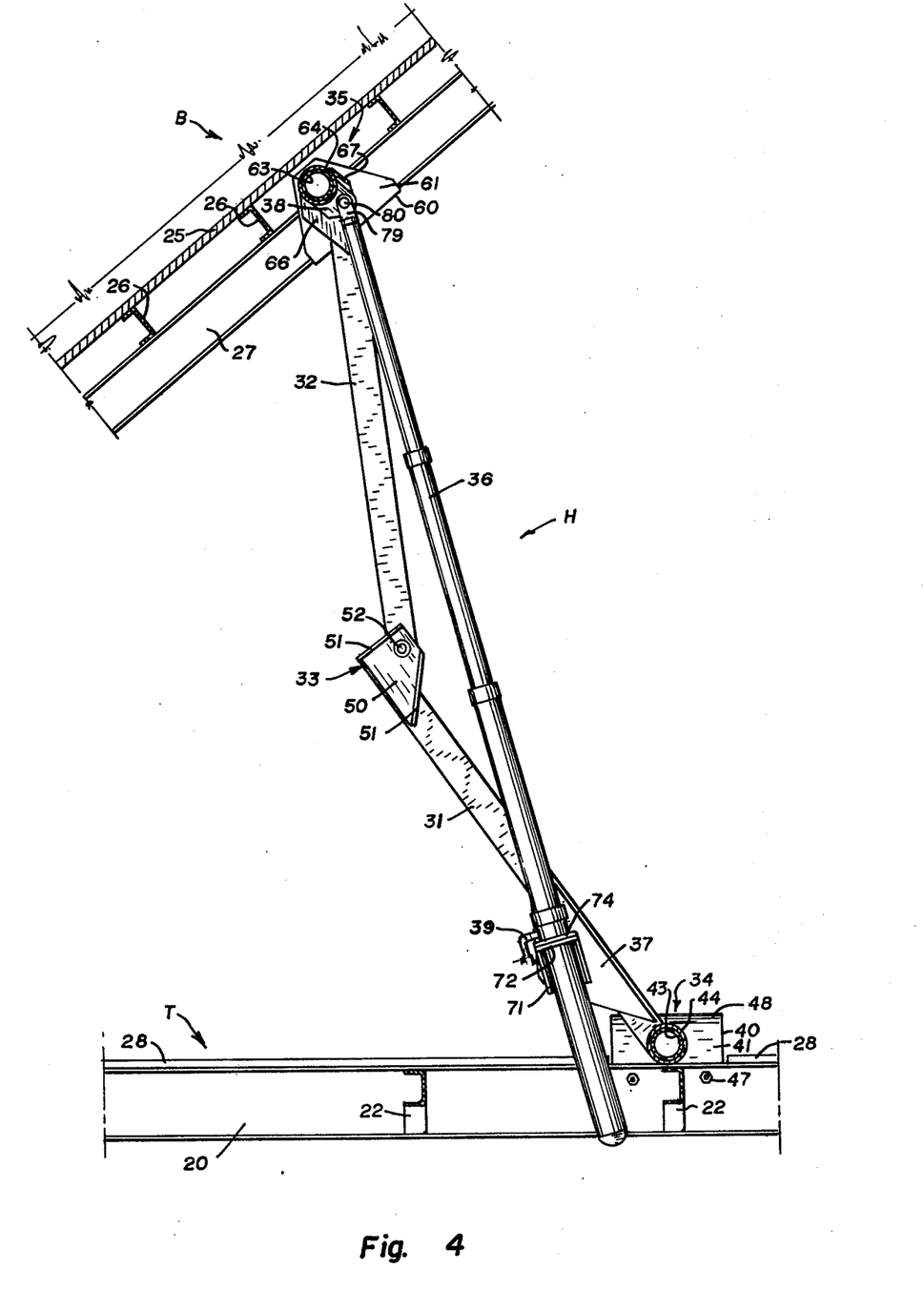
FIG. 4, at sheet 3, is a side elevational view, similar to FIG 2, but showing the hoist completely extended.
Figure 5:
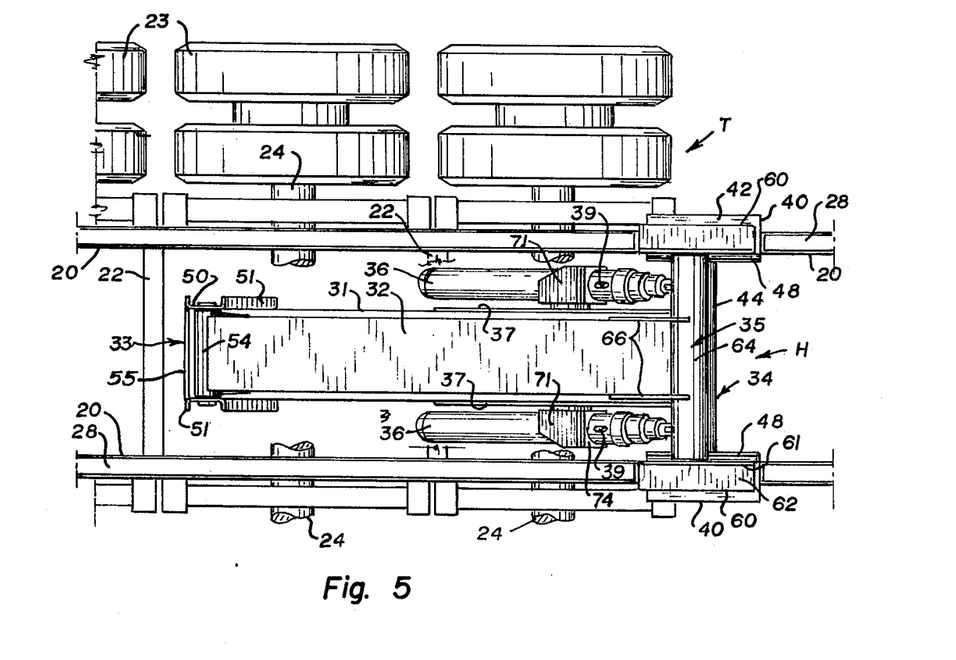
FIG. 5, at sheet 2, is a plan view of the hoist at its retracted position, mounted on the truck frame, as from the indicated arrow -5- at FIG. 2, but with the dump body removed.

This scissor hoist H is actuated by a pair of telescopic compound cylinders 36 which lie in spaced parallelism, one at each side of the leg members 31 and 32. The base of each cylinder is swingably mounted upon a gusset plate 37 attached to the lower leg member 31 near the saddle pivot 34. The extension end of each cylinder is pivotally connected to an ear 38 at or near the support pivot 35, all as hereinafter further described. The base of each cylinder 36 will depend from its mount on the gusset plate 37 and each cylinder will lie between the leg members and the longitudinal truck frame members 20. This arrangement is possible since the width of each leg 20 and 21, when proportioned to provide suitable torsional and lateral rigidity for the large trucks for which the frame is designed, and with twice the rigidity of other comparable types of frames, is only approximately one-half the space between the truck frame members 20; thus, sufficient space is available at each side of the frame to accommodate the cylinders. It is to be noted that in a proper design, the lower leg 31 may be wider than the upper leg 32. It is also to be noted that the location of the saddle pivot 35 upon the longitudinal frame members 20 of the truck T is such that the cylinders will lie between and clear the transverse cross members 22. The necessary hydraulic lines to actuate the cylinder are indicated at 39, at FIG. 4, but such lines and the control mechanisms associated therewith are not shown in detail since they are entirely conventional.

Figure 9:
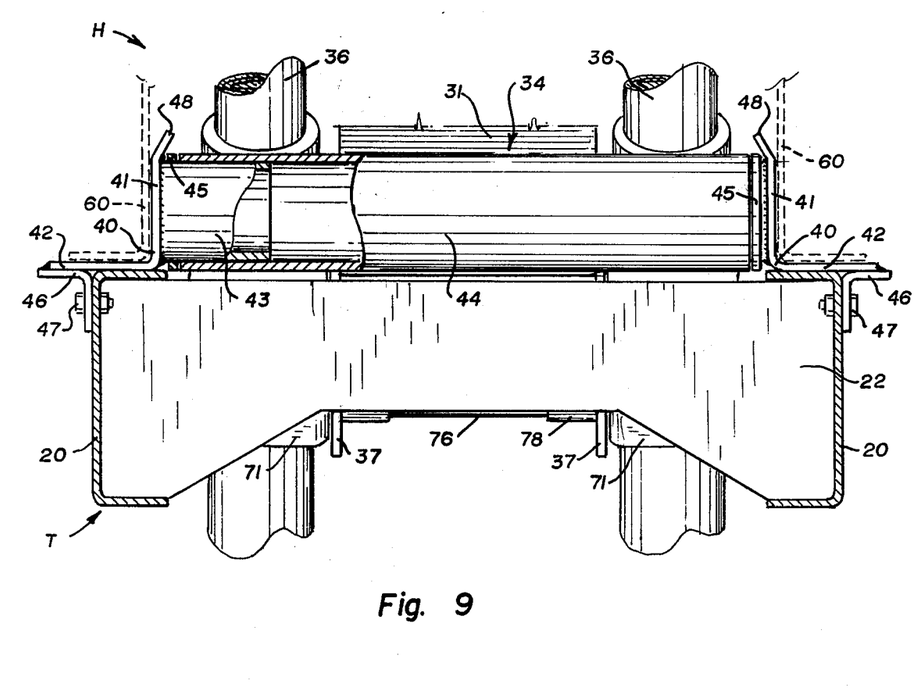
FIG. 9, at sheet 5, is a sectional detail of the frame as taken from the indicated line 9—9 at FIG. 3, but on an enlarged scale and with portions broken away to show parts otherwise hidden from view.

The saddle pivot 34, best illustrated at FIG. 9, includes a pair of short, opposing angle mounts 40, each of which is mounted upon a truck frame member 20. Each mount 40 has an upstanding leg 41 at the inner side of its frame member 20 and an outstanding horizontal leg 42 lying upon the upper flange of the frame member 20. A cylindrical stub 43 is affixed to the inner face of each upstanding leg 41 and a transverse pivot tube 44 is welded to the end of the lower leg 31 of the scissor frame. The tube 44 spans the opening between the frame members 20 and is fitted upon these stubs 43. A spacer ring 45 upon each stub 43 adjacent to the flange leg 41 holds the pivot tube 44 at a centered position between the flange legs 41. It is to be noted that the diameter of the pivot tube 44 may be greater than the cross sectional height of the lower leg 31 to resist various forces imposed upon it requiring an offset connection to the lower leg 31 as illustrated.

The outer portion of each horizontal angle mount leg 42, overhangs the outer face of its respective truck frame member 20 and a short clip angle 46 is welded to the underside of this overhanging portion of the leg 42 to provide a downwardly extended lug which lies against the web of the frame member 20 and is secured thereto by suitable bolts 47. This arrangement permits the angle mounts 40 to be fastened onto the longitudinal frame members 20 to secure the frame in position upon the truck. To complete the saddle pivot 34, the upper edge of each upstanding flange leg 41 is inturned, as at 48, to better guide an angle member of the support pivot 35 to a seating position upon the horizontal leg 42 whenever the frame is retracted as hereinafter further described. This arrangement for forming the pivot is simple and rugged. It is also easy to assemble and disassemble for installation and maintenance of the hoist.

Figure 6:
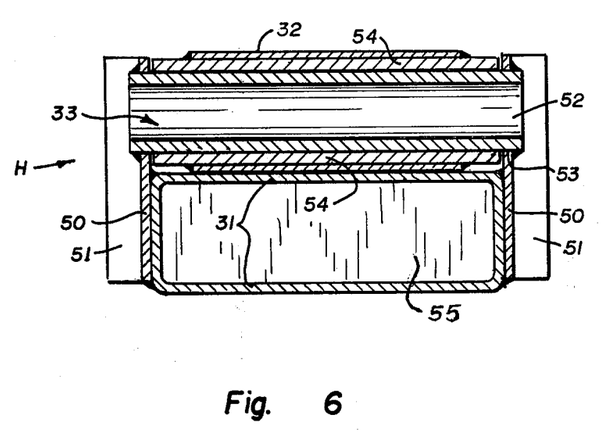
FIG. 6, at sheet 4, is a sectional detail of the frame hinge as taken from the indicated line 6—6 at FIG. 2, but on an enlarged scale and with portions broken away and in section to show parts otherwise hidden from view.

The offset elbow pivot 33, best illustrated at FIG. 6, is formed between a pair of gusset plates 50 welded to the lower leg 31, one at each side of the lower leg member to upstand therefrom and embrace the upper leg 32. Each gusset plate 50 is proportioned to rigidly hold the pivot 33 and is reinforced by folding its upright edges outwardly to form flanges 51. A transverse shaft or bearing tube 52 constituting a pintle extends across the span between the plates 50, above the lower leg 31, through holes 53 in the gusset plates 50 and with a short projection beyond each plate to permit the tube 52 to be welded to the outside faces of the gusset plates. A pivot tube 54 is rotatably mounted upon the bearing tube 52 to extend between the faces of the opposing gusset plates with a small clearance at each side of the tube 52. This pivot tube is welded to the end of the upper leg 32. The components of the elbow pivot 33 are proportioned and positioned such that the lower leg 31 and the upper leg 32 fit snugly against each other when the frame is retracted and yet, have a high degree of torisonal and lateral rigidity at all positions of hoist extension. It is to be noted that the components above described can be reversed, with respect to the legs 31 and 32. However, the end of the leg, 31 or 32, which carries the gusset plates 50 must be closed, as by a cap 55 to increase the rigidity of the leg.

Figure 8:
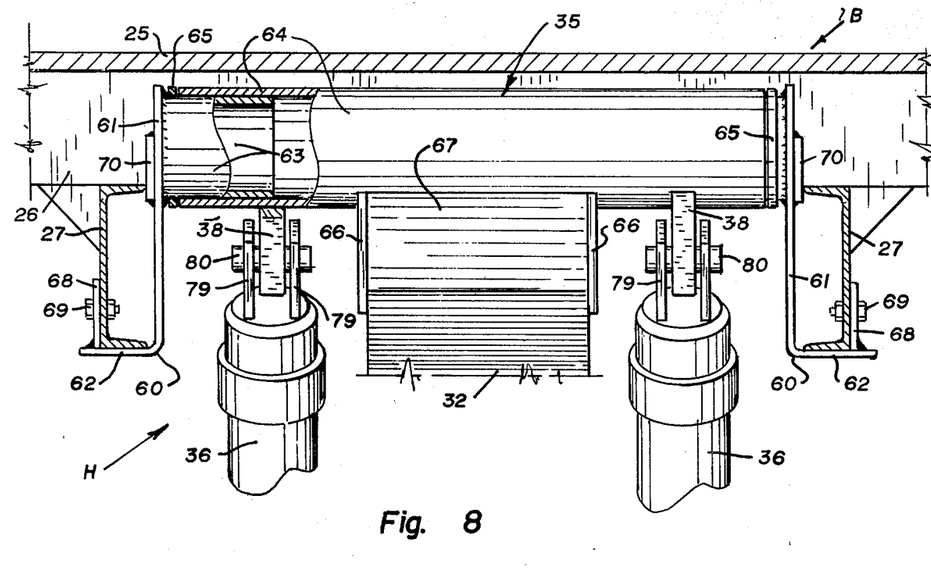
FIG. 8, at sheet 5, is a sectional detail of the frame as taken from the indicated line 8—8 at FIG. 3 but on an enlarged scale and with portions broken away to show parts otherwise hidden from view.

The support pivot 35, best illustrated at FIG. 8, includes a pair of short opposing angle mounts 60, each of which is mounted upon a longitudinal base beam 27 of the dump body. Each flange 60 has an upstanding leg 61 at the inner side of its beam member 27 and an outstanding horizontal leg 62 lying against the under flange of the frame member 27. A cylindrical stub 63 is affixed to the inner face of each upstanding leg 61 and a transverse pivot tube 64 is welded to the end of the upper leg 32 of the scissor frame. The tube 64 spans the opening between the base beams 27 and is fitted upon these stubs 63. A spacer ring 65 upon each stub 63 adjacent to the flange leg 61 holds the pivot tube 64 at a centered position between the flange legs 61.

Figure 7:
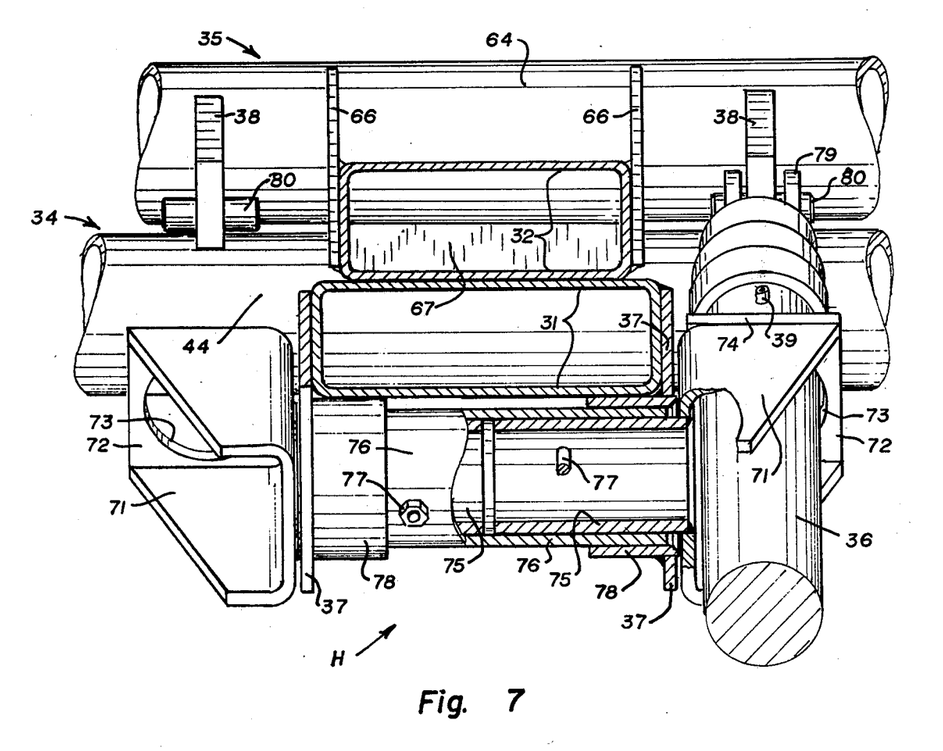
FIG. 7, sheet 4, is a sectional detail of the frame as taken from the indicated line 7—7 at FIG. 2, but on an enlarged scale, with portions broken away to show parts otherwise hidden from view and with one cylinder removed to better show the cylinder mounting yoke.

The flange legs 61 extend upwardly beyond the beam members 27 and into the space between the sills 26 of the dump body to place the pivot tube 64 in this space above the beam members 27. This offsets the pivot tube 64 partially above the upper leg 32, as best shown at FIGS. 2 and 7. The offset is necessary when both the pivot tubes 44 and 64 have a diameter greater than the cross sectional height of the legs 31 and 32 to which they are attached. The larger tubes are to attain a desired strength in a given design as heretofore mentioned. Accordingly, the attachment of the pivot tube 64 to the end of the upper leg 32 is reinforced by gusset plates 66 at each side of the leg 32 to engage the tube 64 and an end cap 67 to close the lower edge of the end of the leg adjacent to the tube 64.

The outer portion of the horizontal leg 62 of each angle mount 60 extends a short distance beyond its beam member and a short lug 68 is welded to this extended portion to upstand therefrom and lie against the web of the beam member 27 and be secured thereto by suitable bolts 69. This permits the support pivot 35 to be securely mounted to the dump body framework. To complete the saddle pivot 35, suitable spacers 70 are provided between each upstanding leg 61 and the beam member 27. The opposing upstanding legs 61 are spaced apart a distance such that the angle mounts 60 will nest on the angle mounts 40 when the frame is retracted, with the horizontal legs 62 being seated upon the horizontal legs 42 as indicated in dotted lines at FIG. 9. This helps to hold the dump body in a rigid position upon the truck when the frame is retracted.

The gusset plates 37, supporting the cylinders 36, as illustrated at FIGS. 2, 3, 4 and 7, are triangular in form and depend a short distance below the lower leg member 31 to which they are attached. Each cylinder is carried in a yoke 71 pivoted to the lower end of a gusset plate 37. Each yoke 71 is formed as a U-shaped section having a cap 72 at one side, and a hole 73 through it to receive a cylinder 36. A plate 74 is fitted onto the cylinder and is affixed to the cap 72 to hold the cylinder in place as illustrated. The base of the yoke adjacent to the gusset plate 37 is formed with an inwardly extended cylindrical stub 75 reaching almost to the center line of the frame. The two opposing cylindrical stubs 75 are connected together by a bearing sleeve 76 which extends across the housing space between the gusset plates 37 and each stub 75 is connected to the sleeve as by a bolt 77 as illustrated at FIG. 7. A short tubular bearing housing 78 is welded to the lower inner face of each gusset plate 37 to extend inwardly a short distance beneath the lower leg 31 and to carry the bearing sleeve 76. With this arrangement, the cylinders carried in their yokes can easily rotate in unison without creating any torsional forces on the frame as the cylinders are extended or retracted and yet the mounting arrangement can be quickly and easily assembled or dismantled as for installation and maintenance.

The upper end of each compound cylinder 36 is formed as a clevis 79 which embraces an ear 38 and is secured thereto by a clevis pin 80 or an equivalent hinging mechanism. The ear 38 is illustrated as being welded to the transverse pivot tube 64 at a proper spacing to keep the cylinders in spaced parallelism as illustrated at FIG. 8. This ear may also be attached, in any suitable manner, to the leg 32 near the pivot tube 64. It is to be noted that the ear 38, welded to the pivot tube 64 or otherwise, may be formed and proportioned in such a manner as to place the axes of the pins 80 at any suitable location with respect to the axes of the yokes 71, about which the cylinders swing. For example, the same cylinders are used to lift a 50,000 pound load with the improved frame, as were previously used with a 40,000 pound load with a frame such as disclosed in the patent, U.S. Pat. No. 3,809,249, where placement of the extension ends of the cylinders was restricted. This freedom in design choice is most advantageous in positioning the cylinders at the best possible location for efficient lifting. This freedom of axis location permits the cylinders to lift a larger dump body with a heavier load.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

What is claimed is:

1. In combination with a dump body mounted upon the frame of a truck or the like, wherein the frame includes a pair of longitudinal frame members and cross members therebetween and the dump body includes a pair of base beams supporting the understructure of the dump body spaced to lie upon the longitudinal frame members of the truck; a scissor frame to stabilize the dump body as it is lifted and tilted including: a lower leg, an upper leg a single transverse elbow pivot interconnecting one end of each leg, a saddle pivot mounted upon the truck frame and connecting with the other end of the lower leg, and a support pivot mounted upon the dump body and connecting with the other end of the upper leg, and wherein:
   (a) each leg is a single rigid, rectangular torsion-resisting tube having a cross sectional width such as to permit it to lie in the space between the dump body base beams and a cross sectional height such as to permit both legs to lie, the upper upon the lower, in the space between the truck frame cross members and the dump body understructure when the dump body rests upon the truck frame;
   (b) the elbow pivot is offset from the legs to permit the upper leg to lie upon the lower leg and is a single member extended substantially across the width of the legs and includes a pintle portion secured to opposite sides of one leg and a pivot tube portion about the pintle portion secured to the other leg; and
   (c) an actuating means to raise and lower the dump body from and to the rest position of the dump body upon the truck frame.

2. The combination defined in claim 1, wherein:
the elbow pivot is offset from one face of one leg and includes:
   (a) a flanged gusset plate securely affixed to each side of one leg with an offsetting plate portion embracing the other leg;
   (b) a single shaft constituting said pintle rigidly connected to and extended between the two offsetting plate portions to define the elbow pivot axis; and
   (c) said pivot tube being affixed to the end of the other leg and pivotally mounted upon the shaft whereby to rigidly hold the pivot axis in a fixed torsion-resisting position with respect to both legs.

3. In the combination defined in claim 1, wherein:
said actuator means is mounted upon at least one side of the upper and lower legs to spread the legs apart to lift the dump body and to permit them to come together to lower the dump body.

4. The combination defined in claim 3 wherein said actuator means is a cylinder means at each side of the legs and wherein:
   (a) a gusset plate at each side of the lower leg depends therefrom;
   (b) a pivot means is extended beneath the lower leg through the gusset plates and terminates as a yoke means at the outward side of each gusset plate;
   (c) a cylinder means is mounted on each yoke means, and includes a clevis means at its extension end; and
   (d) a connector means is provided at each side of the upper leg whereto the clevis means is connected.

5. The combination defined in claim 4 wherein the pivot means includes:
   (a) a stub on each yoke;
   (b) a sleeve extended between the gusset plates connecting with each stub; and
   (c) a bearing housing at each gusset plate wherethrough the sleeve extends.

6. The combination defined in claim 4, including a support pivot tube connecting with the end of the upper leg and said connector means includes an ear affixed to the support pivot at each side of the leg.

7. In combination with a dump body mounted upon the frame of a truck or the like, wherein the frame includes a pair of longitudinal frame members and cross members therebetween and the dump body includes a pair of base beams supporting the understructure of the dump body and spaced to lie upon the longitudinal frame members of the truck; a scissor frame to stabilize the dump body as it is lifted and tilted including: a lower leg, an upper leg, a transverse elbow pivot interconnecting one end of each leg, a saddle pivot mounted upon the truck frame and connecting with the other end of the lower leg, and a support pivot mounted upon the dump body and connecting with the other end of the upper leg, and wherein:
   (a) each leg is a single rigid, rectangular torsion-resisting tube having a cross sectional width such as to permit it to lie in the space between the dump body base beams and a cross sectional height such as to permit both legs to lie, the upper upon the lower, in the space between the truck frame cross members and the dump body understructure when the dump body rests upon the truck frame;
   (b) said saddle pivot includes an angle mount at each truck longitudinal frame member having an upstanding leg above the inward face of the frame member, a pintle means between the upstanding legs of the angle mounts, and a pivot tube at the end of the lower hoist leg upon the pintle means; and
   (c) said support pivot includes:

(i) an angle mount at each dump body base beam having an upstanding angle leg at the inward face of the base beam and a horizontal angle leg against the bottom of the base beam with the upstanding angle legs being spaced to embrace the upstanding angle legs of the saddle pivot when the dump body is lowered upon the truck frame;

(ii) a means securing the horizontal angle leg to the base beam;

(iii) a cylindrical stub inwardly extended from each upstanding angle leg in axial alignment with and opposing the stub on the upstanding leg of the other angle mount;

(iv) a support pivot tube mounted upon and extended between the opposing stubs with an end of said upper hoist leg being affixed to the support pivot tube; and (v) with the support pivot tube being positioned such as to clear the saddle pivot tube and the lower hoist leg when the dump body rests on the truck and with an end of the upper hoist leg being affixed to the support pivot tube at an offset position sufficient to permit the upper hoist leg to rest upon the lower leg when the dump body rests upon the truck frame.

8. The combination defined in claim 7, wherein the support pivot angle mounts nest upon and over the saddle pivot mounts with the horizontal angle leg of the support pivot resting upon the horizontal angle leg of the saddle pivot when the dump body rests upon the truck frame.

9. The combination defined in claim 7, wherein the understructure of the dump body includes cross sills supported upon the base beams and the pivot tubes have diameters greater than the cross sectional height of their respective legs, and the support pivot tube is offset to extend upwardly into the space above the dump body base beams and into the space occupied by and between the cross sills, and the offset connection of the support pivot tube to the end of the upper leg is reinforced with gusset plates.

* * * * *